United States Patent
Kim et al.

(10) Patent No.: US 7,558,511 B2
(45) Date of Patent: Jul. 7, 2009

(54) SCANNING APPARATUS AND METHOD HAVING EDITING FUNCTION, AND MULTI FUNCTIONAL PERIPHERAL USING THE SCANNING METHOD

(75) Inventors: Young-min Kim, Suwon-si (KR); Kyoung-mook Kang, Suwon-si (KR); Sang-cheol Park, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 68 days.

(21) Appl. No.: 11/109,854

(22) Filed: Apr. 20, 2005

(65) Prior Publication Data
US 2005/0254859 A1    Nov. 17, 2005

(30) Foreign Application Priority Data
May 12, 2004    (KR)    ................ 10-2004-0033374

(51) Int. Cl.
*G03G 15/36*    (2006.01)
(52) U.S. Cl. ........................ 399/182; 399/183
(58) Field of Classification Search .............. 399/130, 399/177, 182, 183, 184, 185; 358/1.18, 300, 358/302, 452, 453
See application file for complete search history.

(56) References Cited

U.S. PATENT DOCUMENTS 4,687,317 A * 8/1987 Appel et al. ................ 399/183

(Continued)

FOREIGN PATENT DOCUMENTS

EP    0 991 263    4/2000

(Continued)

OTHER PUBLICATIONS

European Search Report dated May 6, 2008 issued in EP 05103602.8.
Office Action dated Dec. 13, 2005 of the Korean Patent Application No. 10-2004-0033374.

*Primary Examiner*—Hoan H Tran
(74) *Attorney, Agent, or Firm*—Stanzione & Kim, LLP (57) ABSTRACT

A document scanning method and apparatus having an editing function to edit a specific area of a document by defining an editing area of a page to be scanned and then converting the scanned document data of the editing area into a desired form, and a multi functional peripheral using the method. The document scanning method includes inputting the editing area of the page to be scanned, scanning document data from the page, extracting data corresponding to the editing area from the scanned document data, and editing the extracted data. The document scanning apparatus includes an area inputting unit to output information of the editing area of the page to be scanned after receiving an editing area from a user, a scanning unit to read document data from the page to be scanned, an area extracting unit to extract data corresponding to the editing area from the read document data using the information about the editing area received from the area inputting unit, and a data converting unit to edit the extracted data and to output the edited data. The apparatus and method having the editing function enables the user to easily edit the document data by defining the editing area in the page to be scanned and then converting the scanned document data of the editing area into the desired form, and to print or transfer the edited document data without damaging the document or performing an additional editing operation.

32 Claims, 8 Drawing Sheets

U.S. PATENT DOCUMENTS

| | | | |
|---|---|---|---|
| 4,920,502 A * | 4/1990 | Yamada | 358/1.12 |
| 5,157,507 A | 10/1992 | Yamada | |
| 5,206,687 A * | 4/1993 | Suzuki et al. | 399/74 |
| 6,020,094 A * | 2/2000 | Arai et al. | 430/21 |
| 6,323,876 B1 * | 11/2001 | Rao et al. | 345/634 |
| 6,427,058 B1 * | 7/2002 | Akiba et al. | 399/82 |

FOREIGN PATENT DOCUMENTS

| | | |
|---|---|---|
| EP | 1 089 161 | 4/2001 |
| JP | 07-131629 | 5/1995 |
| JP | 2000-151986 | 5/2000 |
| KR | 100152350 B1 | 6/1998 |
| KR | 1020000032926 | 6/2000 |
| KR | 1020000032926 A | 6/2000 |
| KR | 1020030047333 A | 6/2003 |

* cited by examiner

| DESIGNATED PROCESS EFFECT | START POINT (x, y) | END POINT (x, y) |
|---|---|---|
| UNDERLINE PROCESS | a (21, 47) | b (65, 47) |
| BLACK MARKING | c (35, 135) | d (100, 145) |
| MOSAIC PROCESS | e (55, 190) | f (75, 210) |
| GRAPHIC RECOGNITION | g (23, 160) | h (180, 180) |
| OUTLINE PROCESS | i (90, 20) | j (180, 112) |

SCANNING APPARATUS AND METHOD HAVING EDITING FUNCTION, AND MULTI FUNCTIONAL PERIPHERAL USING THE SCANNING METHOD

CROSS-REFERENCE TO RELATED APPLICATIONS

This application claims the priority of Korean Patent Application No. 10-2004-33374, filed on May 12, 2004 in the Korean Intellectual Property Office, the disclosure of which is incorporated herein in its entirety by reference.

BACKGROUND OF THE INVENTION

1. Field of the Invention

The present general inventive concept relates to a scanning method and apparatus, and more particularly, a document scanning method and apparatus having an editing function to edit a specific area of the document by defining an editing area of a page to be scanned and then converting scanned document data of the editing area into a desired form, and a multi functional peripheral using the method.

2. Description of the Related Art

Typically, a multi functional peripheral having an editing function reads document data from a page of a document to be scanned, and prints the read document data or transfers the document data to a communication device such as a modem. Accordingly, when an original document is scanned and printed or transferred, in general, an image of the original document is scanned intact and printed or transferred.

However, a user may want to edit the document data before printing or transferring, for example, underlining a specific area for emphasis, creating an outline for definition, or applying a mosaic or blackout to secure contents of the document. To this end, either the user directly edits the document before scanning, or the user first scans the document, edits the scanned document data, and then prints or transfers the edited document.

In a conventional scanning method, if a page of a document to be scanned is edited before scanning, printing or transferring, the document may be damaged due to direct editing by a user. Alternatively, when the document data is to be edited after scanning, an additional editing operation is required.

SUMMARY OF THE INVENTION

The present general inventive concept provides a document scanning method and apparatus having an editing function to concert data of an editing area of a document into a desired form after defining the editing area of a page to be scanned in the document, and a multi functional peripheral using the method.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing a document scanning method including inputting an editing area of a page to be scanned, scanning document data from the page, extracting data corresponding to the input editing area from the scanned document data, and editing the extracted data.

The inputting of the editing area may include inputting coordinates of an area to be edited in the page to be scanned as the editing area. The inputting of the editing area may include inputting a graphic area in the page to be scanned as the editing area. The inputting of the editing area may include inputting a text area in the page to be scanned as the editing area.

When the graphic area is input as the editing area of the page, the extracting of the data may include classifying the scanned document data into the graphic area and the text area, and extracting graphic area data from the scanned document data.

When the text area is input as the editing area of the page, the extracting of the data may include classifying the scanned document data into a graphic area and a text area, and extracting text area data from the document data.

The editing of the extracted data may include editing the extracted data to underline or outline the editing area with a line of a predetermined thickness and color. Further, the editing of the extracted data may include editing the extracted data to fill the editing area with a predetermined color or to apply a mosaic of a predetermined color to the editing area.

The foregoing and/or other aspect and advantages of the present general inventive concept may also be achieved by providing a document scanning apparatus including an area inputting unit to output information of an editing area of a page to be scanned after receiving the editing area from a user, a scanning unit to read document data from the page to be scanned, an area extracting unit to extract data corresponding to the editing area from the read document data using the information of the editing area received from the area inputting unit, and a data converting unit to edit the extracted data and to output the edited data.

The area inputting unit may receive coordinates of the editing area of the page to be scanned from a user. Further, the area inputting unit may receive a graphic area or a text area of the page to be scanned as the editing area from a user.

The area extracting unit may include an area classifying unit to classify the read document data into the graphic area and the text area, and a graphic area extracting unit to output graphic area data by extracting the graphic area data from the document data. The area extracting unit may include an area classifying unit to classify the read document data into the graphic area and the text area, and a text area extracting unit to output text area data by extracting the text area data from the read document data.

The data converting unit may edit the extracted data to underline or outline the editing area with a line of a predetermined thickness and color. Additionally, the data converting unit may edit the extracted data to fill the editing area of the page with a predetermined color or apply a mosaic of a predetermined color to the editing area of the page.

The foregoing and/or other aspects and advantages of the present general inventive concept may also be achieved by providing a multi functional peripheral having an editing function, the multi functional peripheral including an area inputting unit to output information of an editing area of a page to be scanned after receiving the editing area from a user, a scanning unit to read document data from the page to be scanned, an area extracting unit to extract data corresponding to the editing area of the read document data by using the information of the editing area received from the area inputting unit, a data converting unit to output the extracted data after editing the data, and an outputting unit to output the edited document data.

The outputting unit may be a printing unit to print the edited document data or a transferring unit to transfer the edited document data to an external device.

The foregoing and/or other aspects and advantages of the present general inventive concept may also be achieved by providing a computer readable recording medium containing a computer readable code to perform a document scanning method having an editing function, the method including inputting an editing area of a page to be scanned, scanning document data from the page, extracting data corresponding to the input editing area from the scanned document data, and editing the extracted data.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 1:
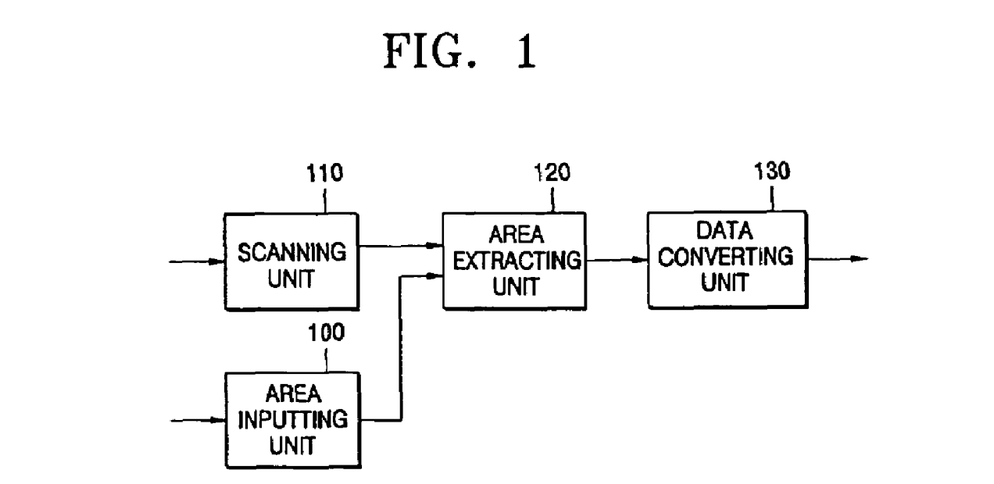
FIG. 1 is a block diagram illustrating a document scanning apparatus having an editing function according to an embodiment of the present general inventive concept.
Figure 10:
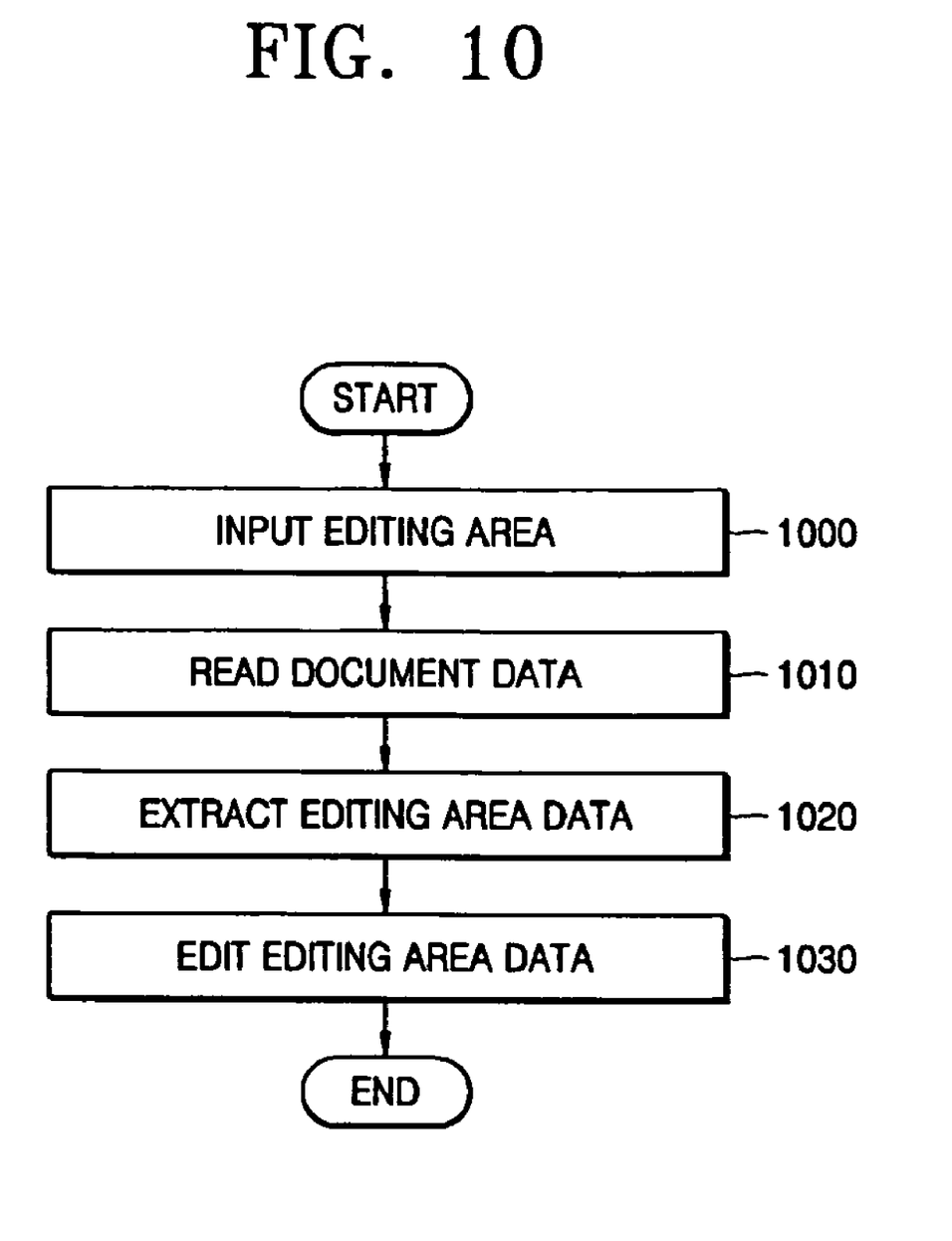
FIG. 10 is a flowchart illustrating a document scanning method having an editing function according to an embodiment of the present general inventive concept.

FIG. 1 is a structural block diagram illustrating a document scanning apparatus having an editing function according to an embodiment of the present general inventive concept. FIG. 10 is a flowchart illustrating a document scanning method having an editing function according to an embodiment of the present general inventive concept. The scanning apparatus illustrated in FIG. 1 will be described together with the scanning method illustrated in FIG. 10. Referring to FIG. 1, the document scanning apparatus includes an area inputting unit 100, a scanning unit 110, an area extracting unit 120 and a data converting unit 130.

A user inputs an editing area into the area inputting unit 100, and according to the user's input, the area inputting unit 100 outputs information about the editing area of a page of a document to be scanned (operation 1000). In the operation 1000, the user can delineate the editing area by inputting a coordinate corresponding to the editing area of the page to be scanned. Also, the user may selectively input a graphic area or a text area as the editing area.

The scanning unit 110 scans the page to generate scanned document data of the page to be scanned (operation 1010). The area extracting unit 120 extracts editing area data from the scanned document data of the page received from the scanning unit 110 according to the information about the editing area received from the area inputting unit 100 (operation 1020). The data converting unit 120 receives the extracted data (extracted editing area data) of the editing area extracted by the area extracting unit 120, and outputs data of the editing area by editing the extracted data according to the editing function designated by the user (operation 1030).

In the operation 1030, after editing the data of the editing area extracted in the operation 1020, the edited data is merged into the scanned document data of the page. That is, the scanned document data of the page may include the editing area and a non-editing area, and the extracted data corresponding to the editing area may be replaced with the edited data. Accordingly, the scanned document data of the page may include the edited data of the editing area and the remaining data of the non-editing area.

The extracted document data (editing area data) may be edited by a method of, for example, underlining the editing area with a line of a certain thickness and color or putting an outline of a certain thickness and color around the editing area. In addition, the extracted document data may be edited to cover the editing area with a certain color or a mosaic may be applied to the editing area.

The scanning apparatus illustrated in FIG. 1 may operate as a multi functional peripheral including an outputting unit to output the edited document data received from the data converting unit 130. The outputting unit may be a printing unit to print the edited document data or a transferring unit to send the document data to the external device. The multifunctional peripheral may print and/or output either the edited document data or the merged data including the edited data of the editing area and the remaining data of the non-editing area.

Figure 2:
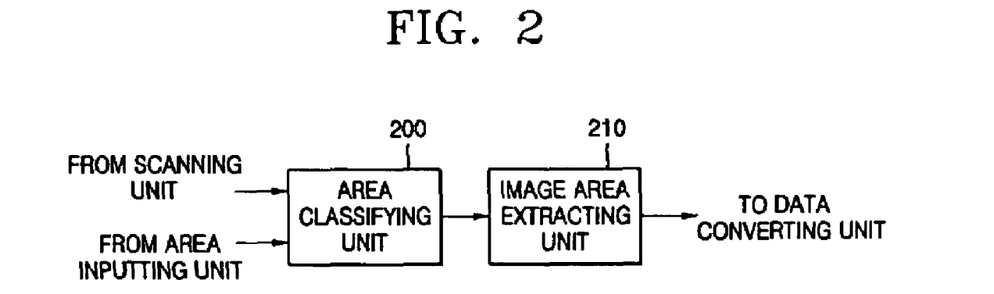
FIG. 2 is a detailed block diagram illustrating an area extracting unit of the document scanning apparatus of FIG. 1.
Figure 11:
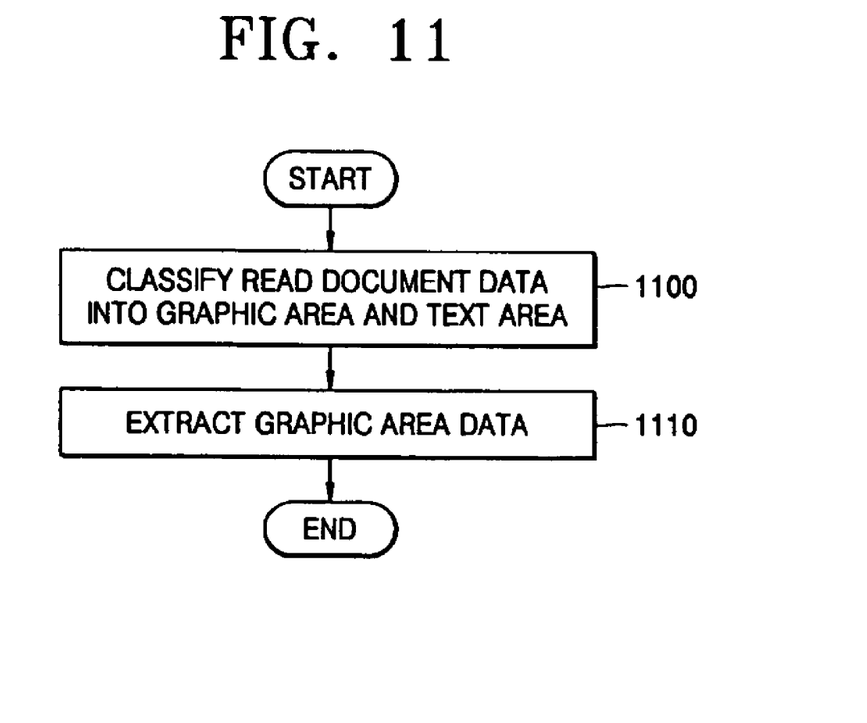
FIG. 11 is a detailed flowchart illustrating a classifying operation of the method of extracting the editing area data of FIG. 10.

FIG. 2 is a detailed block diagram illustrating the area extracting unit 120 of FIG. 1. FIG. 11 is a detailed flowchart illustrating an operation of extracting data of the editing area in FIG. 10. The area extracting unit 120 illustrated in FIG. 2 will be described in association with the extracting method illustrated in FIG. 11. Referring to FIG. 2, the area extracting unit 120 includes an area classifying unit 200 and a graphic area extracting unit 210.

Figure 7:
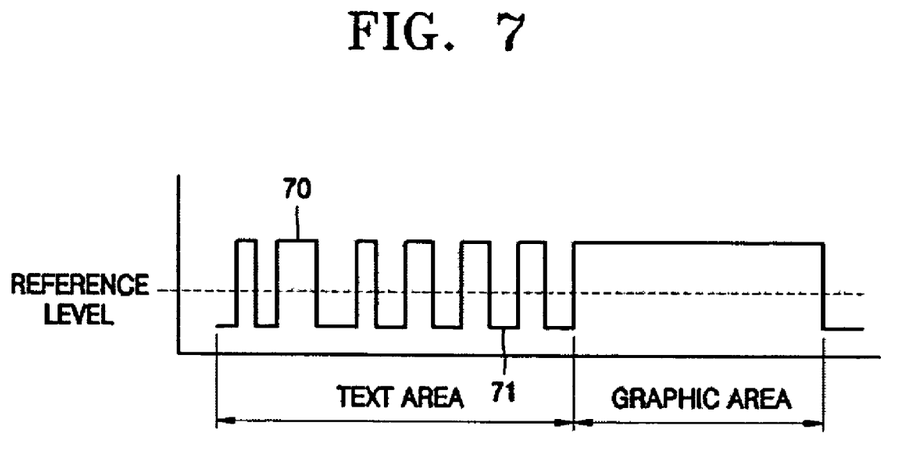
FIG. 7 is a view illustrating a method of classifying a graphic area and a text area of a page according to an embodiment of the present general inventive concept.

The area classifying unit 200 classifies the read document data received from the scanning unit 110 into graphic area data and text area data according to the selected graphic area information received from the area inputting unit (operation 1100). It is possible to recognize the classified area automatically using features of the data of each area. FIG. 7 is a view illustrating the method of classifying image data and text data on a page. Referring to FIG. 7, the document data read by the scanning unit 110 is processed line by line. In the document data, a part 70 having a value higher than a reference level is where an image is included, and data of this part is printed or transferred, and a part 71 having a value lower than the reference level is where no image exists. Further, in the document data, data of the text area varies at a higher frequency, and data of the graphic area is not changed frequently. The area classifying units 200 and 300 can classify the read document data into text areas and graphic areas using the frequency of the data.

The graphic area extracting unit 210 receives information about the graphic area data from the area classifying unit and extracts the graphic area data from the read document data (operation 1110).

Figure 3:
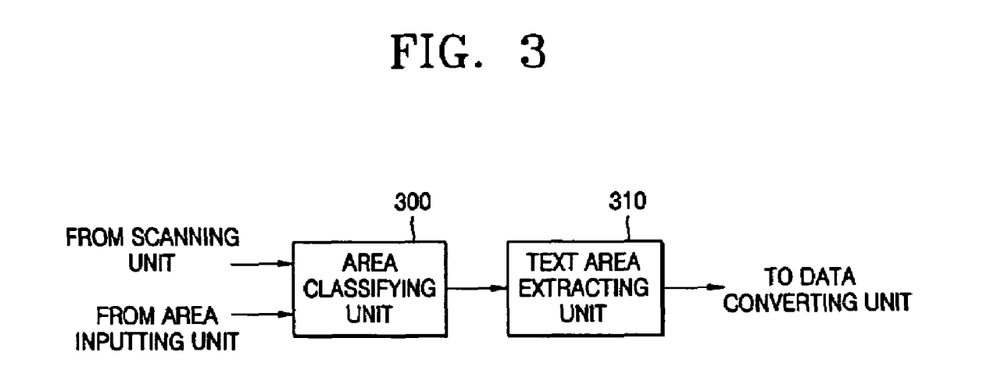
FIG. 3 is a detailed block diagram illustrating an area extracting unit of the document scanning apparatus of FIG. 1.
Figure 12:
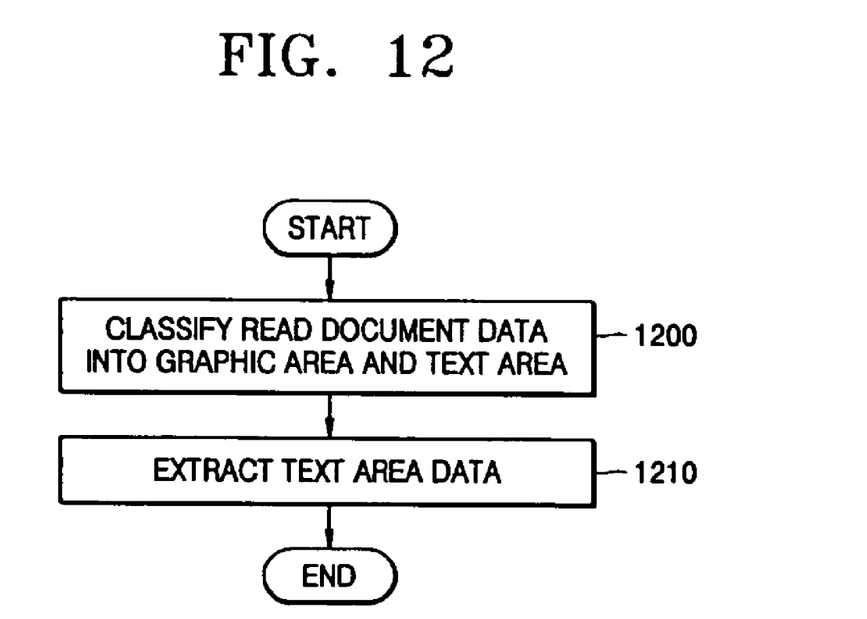
FIG. 12 is a detailed flowchart illustrating a classifying operation of the method of extracting the editing area data of FIG. 10.

FIG. 3 is a detailed block diagram illustrating the area extracting unit 120 of FIG. 1. FIG. 12 is a detailed flowchart illustrating an operation of extracting data of the editing area of FIG. 10. The area extracting unit 120 illustrated in FIG. 3 will be described together with the extracting method illustrated in FIG. 12. Referring to FIG. 3, the area extracting unit 120 includes an area classifying unit 300 and a text area extracting unit 310.

The area classifying unit 300 classifies the read document data received from the scanning unit 110 into the graphic area data and the text area data according to the selected text area information received from the area inputting unit 100 (operation 1200). As illustrated in FIG. 7, it is possible to automatically recognize the classified area using the features of the data of each area. The text area extracting unit 310 receives information about the text area data from the area classifying unit, and extracts the text area data from the read document data (operation 1210).

Figure 4A:
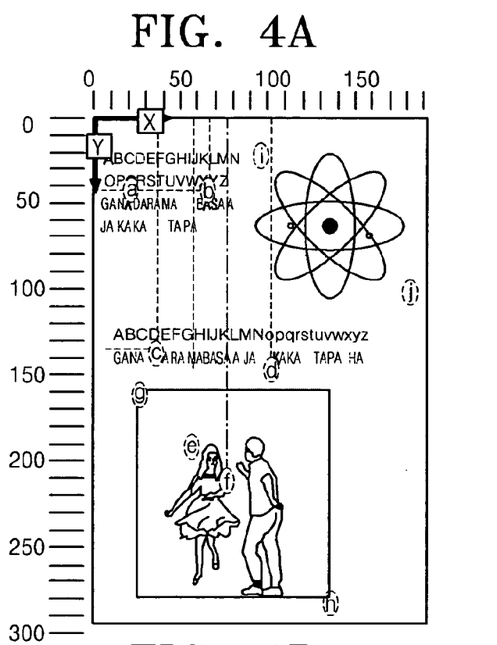
FIG. 4A is a view illustrating a page to be scanned using an editing function.
Figure 4B:
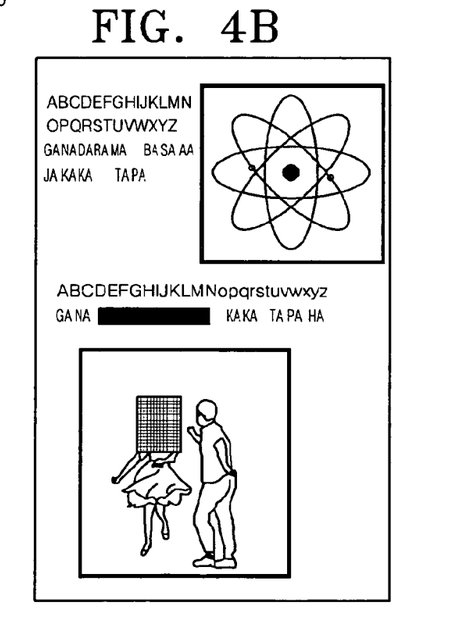
FIG. 4B is a view illustrating a result when the page of FIG. 4A is edited using the document scanning apparatus of FIG. 1.
Figure 4C:
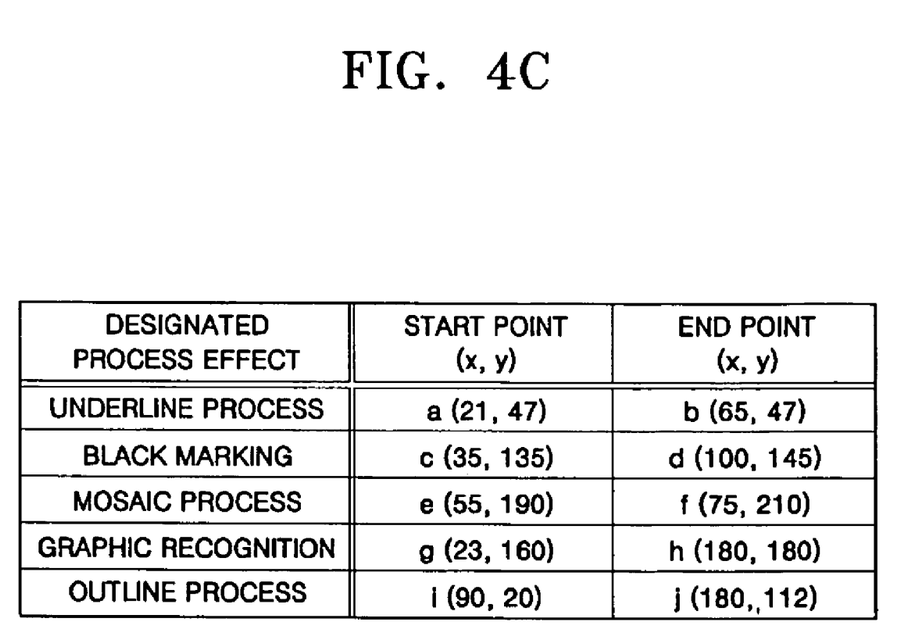
FIG. 4C is a view illustrating a table of coordinates corresponding to each editing area in FIG. 4B.

FIG. 4A is a view illustrating a page having document data to be edited. FIG. 4B is a view illustrating a result when the document data of FIG. 4A is edited using the document scanning apparatus of FIG. 1. FIG. 4C is a view illustrating a table of coordinates corresponding to each editing area in FIG. 4B. The coordinates shown in FIG. 4C are specified by a user's input through the area inputting unit 100.

To underline a certain area of the page, the user inputs a start point (a(21,47)) and endpoint (b(65,47)) of the certain area, so that the edited document data between the point 'a' and 'b' is underlined as shown in FIG. 4A.

To black out (or shade) a certain area of the page, the user inputs a start point (c(35,135)) and endpoint (d(100,145)) of the certain area, so that the edited document data within the rectangular area having corner points 'c' and 'd' is blacked out (or shaded) as shown in FIGS. 4A and 4B.

To apply a mosaic to a certain area of the page, the user inputs a start point (e(55,190)) and endpoint (f(75,210)) of the area, so that a mosaic is applied within the rectangular area having corner points 'e' and 'f' as shown in FIG. 4B.

To put an outline on a certain area of the page, the user inputs a start point (i (90,20)) and endpoint (j (180,112)) of the area, so that a rectangular area having corner points 'i' and 'j' is bordered (surrounded) with a line of a certain thickness as shown in FIG. 4B.

To put an outline on a graphic area of the page, a text area and a graphic area are distinguished and a start point (g (23,160)) and endpoint (h (180,180)) of the graphic area are recognized, so that a rectangular area having corner points 'g' and 'h' is outlined with a line of a certain thickness as shown in FIG. 4B.

Figure 6:
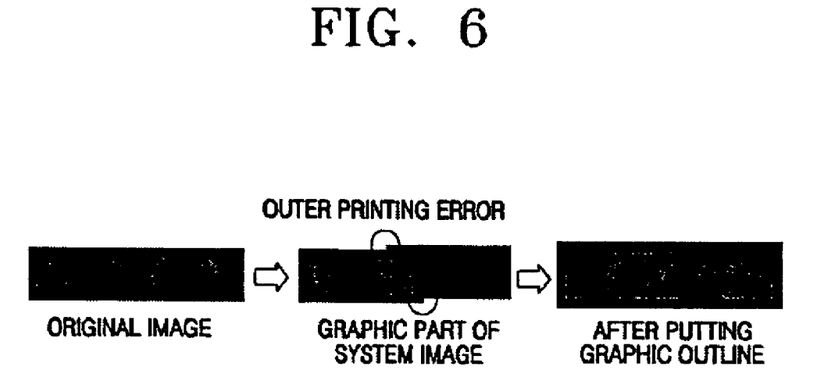
FIG. 6 is a view illustrating a method of compensating operation by putting an outline on an editing area of a page.

According to the embodiment of the present general inventive concept, an outer printing error in the editing area in a page can be compensated by putting an outline around the editing area. Here, the outer printing error may be caused by misaligned paper or disturbance during scanning. FIG. 6 is a view illustrating a method of compensating for an outer printing error by putting an outline around the editing area of the page. Referring to FIG. 6, the outer printing error may occur in image data read from an original image. However, the outer printing error can be compensated by putting the outline on the outer printing error so that the editing area of the image data can be recognized clearly.

Figure 5:
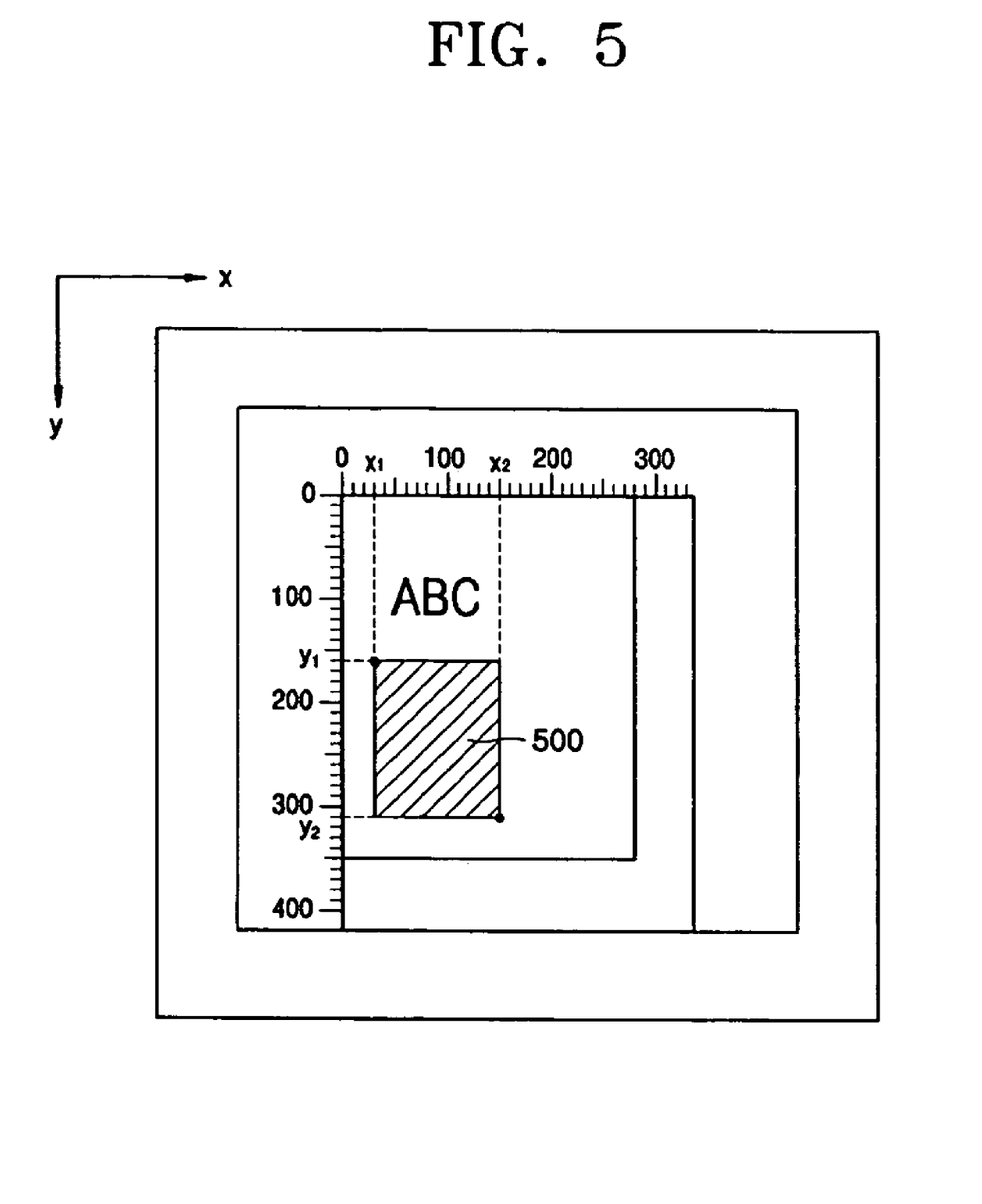
FIG. 5 is a view illustrating a method of inputting coordinates of an editing area in an editing function.

By inputting the coordinates of the editing area, a start point and an endpoint can be input. FIG. 5 is a view illustrating a method of defining the editing area by inputting the coordinates of the editing area. In this method, a page to be scanned is placed face-up, and the editing area is defined by inputting the coordinates of the area 500 to be edited, namely, a start point (x1, y1) and an endpoint (x2, y2). After inputting the coordinates, the page is turned over and scanned, and then the page can be scanned with the area defined according to the coordinates.

Figure 8:
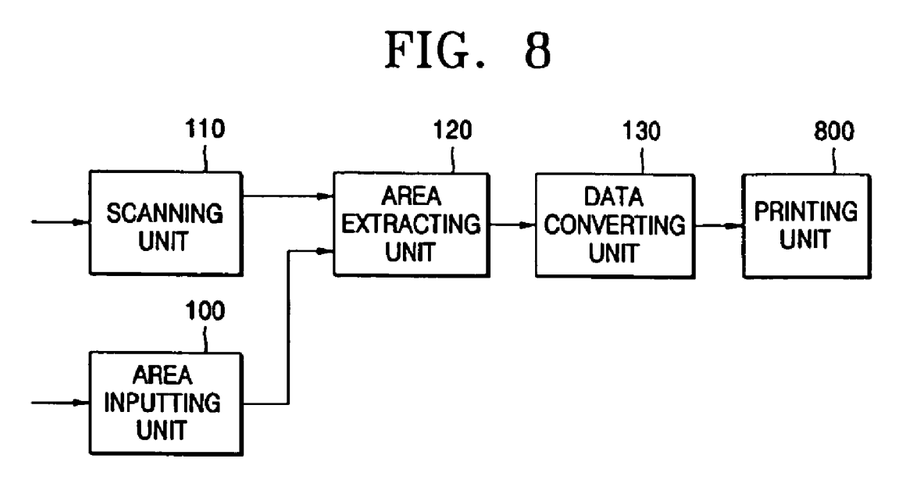
FIG. 8 is a structural block diagram illustrating a multi functional peripheral to print a document using a document scanning apparatus having an editing function according to an embodiment of the present general inventive concept.

FIG. 8 is a structural block diagram illustrating a multi functional peripheral to print a document using a document scanning apparatus having an editing function according to an embodiment of the present general inventive concept. The multi functional peripheral includes an area inputting unit 100, a scanning unit 110, an area extracting unit 120, a data converting unit 130, and a printing unit 800.

Since the area inputting unit 100, the scanning unit 110, the area extracting unit 120 and the data converting unit 130 are identical to those in FIG. 1, the descriptions thereof will be omitted. The printing unit 800 receives the edited document data from the data converting unit 130 and prints the edited document data.

Figure 9:
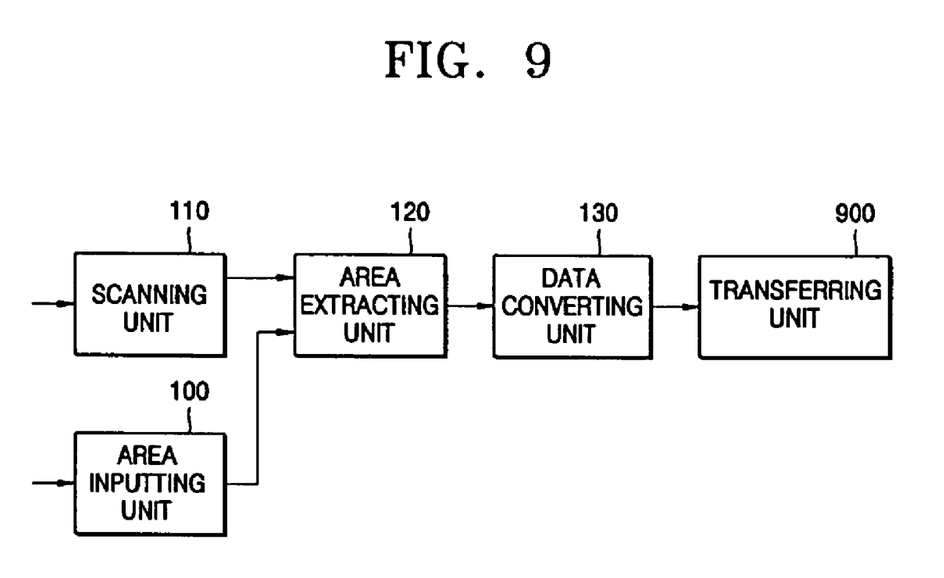
FIG. 9 is a structural block diagram illustrating a multi functional peripheral to send document data using a document scanning apparatus according to the embodiment of the present general inventive concept.

FIG. 9 is a structural block diagram illustrating a multi functional peripheral to transfer document data using a document scanning apparatus having an editing function according to the embodiment of the present general inventive concept. The multi functional peripheral includes an area inputting unit 100, a scanning unit 110, an area extracting unit 120, a data converting unit 130 and transferring unit 900.

Since the area inputting unit 100, the scanning unit 110, the area extracting unit 120 and the data converting unit 130 are identical to those in FIG. 1, the descriptions thereof will be omitted. The transferring unit 900 receives the edited document data from the data converting unit 130 and sends the edited document data to an external device.

The general inventive concept can also be embodied as a computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the internet).

As described above, a document scanning apparatus and method having an editing function according to the preset general inventive concept enables a user to easily edit and scan a document by defining an editing area in a page to be scanned and converting the scanned document data of the editing area into a desired form, without damaging the document or performing an additional editing operation.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A document scanning method comprising:
   inputting an editing area of a page to be scanned before the page is scanned;
   obtaining document data of the page when the page is scanned;
   extracting data corresponding to the editing area from the document data; and
   editing the extracted data according to one or more editing functions.

2. The method of claim 1, wherein the inputting of the editing area comprises inputting the coordinates of an area to be edited in the page to be scanned as the editing area.

3. The method of claim 1, wherein the inputting of the editing area comprises inputting a graphic area in the page to be scanned as the editing area.

4. The method of claim 1, wherein the inputting of the editing area comprises inputting a text area in the page to be scanned as the editing area.

5. The method of claim 1, wherein the extracting of the data comprises:
   classifying the data corresponding to the editing area of the document data into a graphic area and a text area; and
   extracting graphic area data of the graphic area from the document data as the extracted data.

6. The method of claim 1, wherein the extracting of the data comprises:
   classifying the data corresponding to the editing area of the document data into a graphic area and a text area; and
   extracting text area data of the text area from the document data as the extracted data.

7. The method of claim 1, wherein the editing of the extracted data comprises editing the extracted data to underline the editing area with a line of a predetermined thickness and color.

8. The method of claim 1, wherein the editing of the extracted data comprises editing the extracted data to put an outline of a predetermined thickness and color around the editing area.

9. The method of claim 1, wherein the editing of the extracted data comprises editing the extracted data to fill the editing area with a predetermined color.

10. The method of claim 1, wherein the editing of the extracted data comprises editing the extracted data to apply a mosaic of a predetermined color to the editing area.

11. The method of claim 1, wherein the editing of the extracted data comprises:
    determining a characteristic of the editing area; and
    editing the extracted data according to the editing characteristic of the editing area.

12. The method of claim 1, wherein the editing of the extracted data comprises:
    determining a frequency of the extracted data; and
    editing the extracted area according to an editing value corresponding to the frequency.

13. The method of claim 1, wherein the document data comprises editing area data corresponding to the editing area and non-editing data corresponding to a non-editing area other than the editing area, and the editing of the extracted data comprises combining the edited data with the non-editing data as an edited page.

14. A document scanning apparatus comprising:
    an area inputting unit which outputs information of an editing area of a page to be scanned before the page is scanned;
    a reading unit which reads document data from the page when the page is scanned;
    an area extracting unit which extracts data corresponding to the editing area from the read document data using the information of the editing area received from the area inputting unit; and
    a data converting unit which edits the extracted data according to one or more editing functions and outputs the edited data.

15. The apparatus of claim 14, wherein the reading unit comprises a scanning unit to scan the page so that the document data is read from the scanned page.

16. The apparatus of claim 14, wherein the area inputting unit receives coordinates of the editing area from a user and outputs the coordinates as the information of the editing area.

17. The apparatus of claim 14, wherein the area inputting unit receives a graphic area or a text area of the page to be scanned as the editing area from a user and outputs at least one of the graphic area and the text area as the information of the editing area.

18. The apparatus of claim 14, wherein the area extracting unit comprises:
    an area classifying unit which classifies the read document data into a graphic area and a text area; and
    a graphic area extracting unit which outputs graphic area data by extracting the graphic area data from the read document data as the extracted data.

19. The apparatus of claim 14, wherein the area extracting unit comprises:
    an area classifying unit which classifies the read document data into a graphic area and a text area; and
    a text area extracting unit which outputs text area data by extracting the text area data from the scanned document data as the extracted data.

20. The apparatus of claim 14, wherein the data converting unit edits the extracted data to underline the editing area of the page with a line of a predetermined thickness and color.

21. The apparatus of claim 14, wherein the data converting unit edits the extracted data to put an outline of a predetermined thickness and color around the editing area of the page.

22. The apparatus of claim 14, wherein the data converting unit edits the extracted data to fill the editing area of the page with a predetermined color.

23. The apparatus of claim 14, wherein the data converting unit edits the extracted data to apply a mosaic of a predetermined color to the editing area of the page.

24. The apparatus of claim 14, wherein the data converting unit determines a characteristic of the editing area and edits the extracted data according to the editing characteristic of the editing area.

25. The apparatus of claim 24, wherein the data converting unit determines a frequency of the extracted data, and edits the extracted area according to an editing value corresponding to the frequency.

26. The apparatus of claim 14, wherein the document data comprises editing area data corresponding to the editing area and non-editing data corresponding to a non-editing area other than the editing area, and the data converting unit combines the edited data with the non-editing data as an edited page.

27. A multi functional peripheral having an editing function, the multi functional peripheral comprising:

an area inputting unit which outputs information of an editing area of a page to be scanned before the page is scanned;

a scanning unit which reads document data from the page to be scanned;

an area extracting unit which extracts data corresponding to the editing area of the read document data using the information of the editing area received from the area inputting unit;

a data converting unit which outputs the extracted data after editing the data according to one or more editing functions; and an outputting unit which outputs the edited document data.

28. The multi functional peripheral of claim 27, wherein the outputting unit comprises a printing unit which prints the edited document data.

29. The multi functional peripheral of claim 27, wherein the outputting unit comprises a transferring unit which transfers the edited document data to an external device.

30. A computer readable recording medium having a computer readable code to perform a document scanning method, the document scanning method comprising:

inputting an editing area of a page to be scanned before the page is scanned;

obtaining document data from the page when the page is scanned;

extracting data corresponding to the editing area from the document data; and editing the extracted data according to one or more editing function.

31. A document scanning apparatus, comprising:

an area inputting unit to define an editing area prior to scanning a document;

a scanning unit to scan the document and generate scanned document data;

an area extracting unit to extract scanned document data corresponding to the defined editing area;

a data converting unit to edit the extracted scanned document data, according to one or more editing functions, and to replace generated scanned document data corresponding to the editing area with the edited extracted scanned document data.

32. The document scanning apparatus of claim 31, wherein the editing area is defined as one of a text area, a graphic area, and a coordinate delineated area.

* * * * *